United States Patent [19]

Blumberg

[11] Patent Number: 5,664,896
[45] Date of Patent: Sep. 9, 1997

[54] SPEED TYPING APPARATUS AND METHOD

[76] Inventor: Marvin R. Blumberg, 7105 Broxburn Dr., Bethesda, Md. 20817

[21] Appl. No.: 705,093

[22] Filed: Aug. 29, 1996

[51] Int. Cl.[6] ............................................. B41J 5/00
[52] U.S. Cl. ........................... 400/485; 400/91; 395/796
[58] Field of Search ............................. 400/91, 100, 110, 400/484, 485; 395/326, 794, 796, 803

[56] References Cited

U.S. PATENT DOCUMENTS

| | | | |
|---|---|---|---|
| Re. 32,773 | 10/1988 | Goldwasser et al. | 364/419 |
| Re. 34,304 | 7/1993 | Goldwasser et al. | 341/22 |
| 4,339,806 | 7/1982 | Yoshida | 364/900 |
| 4,396,992 | 8/1983 | Hayashi et al. | 364/900 |
| 4,459,049 | 7/1984 | Howell et al. | 400/98 |
| 4,464,070 | 8/1984 | Hanft et al. | 400/98 |
| 4,566,065 | 1/1986 | Toth | 364/300 |
| 4,633,227 | 12/1986 | Menn | 340/365 |
| 4,650,349 | 3/1987 | Westreich | 400/98 |
| 4,680,725 | 7/1987 | Lapeyre | 364/709 |
| 4,760,528 | 7/1988 | Levin | 364/419 |
| 4,807,181 | 2/1989 | Duncan, IV et al. | 364/900 |
| 4,842,428 | 6/1989 | Suzuki | 400/697 |
| 4,891,777 | 1/1990 | Lapeyre | 364/706 |
| 4,891,786 | 1/1990 | Goldwasser | 400/98 |
| 4,893,238 | 1/1990 | Venema | 364/419 |
| 4,924,431 | 5/1990 | Lapeyre | 364/709 |
| 4,969,097 | 11/1990 | Levin | 364/419 |
| 5,007,008 | 4/1991 | Beers | 364/709 |
| 5,062,070 | 10/1991 | Lapeyre | 364/709 |
| 5,164,723 | 11/1992 | Nebenzahl | 400/90 |
| 5,404,321 | 4/1995 | Mattox | 364/709 |
| 5,410,305 | 4/1995 | Barrus et al. | 341/22 |
| 5,577,188 | 11/1996 | Zhu | 395/326 |

*Primary Examiner*—John S. Hilten
*Attorney, Agent, or Firm*—Jacobson, Price, Holman & Stern, PLLC

[57] ABSTRACT

A speed typing method and apparatus having multiple letters associated with each key of a keyboard. By utilizing multiple characters on each key, fewer than 26 letter keys may be employed. Each key on the keyboard is associated with a numerical code. The system uses the numerical code associated with a typed word to access a dictionary or table of words stored in memory at a memory location corresponding to the input numerical code. The system may display all of the words available to the user in response to the input code. The user then selects one of the available words to be placed in the document. Alternatively the system may enable display of one or more preferred words.

94 Claims, 11 Drawing Sheets

SPEED TYPING APPARATUS AND METHOD

BACKGROUND OF THE INVENTION

1. Field of the Invention

The present invention relates to a method and apparatus which makes it easier to learn to type, improves on the accuracy of typing, increases typing speed and reduces wear on the user. More particularly, the present invention relates to a system for the rapid entry of text into a microprocessor-controlled word processing system making use of a keyboard having multiple alphabet letter characters assigned to some or all of the keys.

2. Description of the Related Art

Conventional typewriters make use of twenty-six (26) letter keys, one for each letter of the English alphabet. One of the initial keyboard layouts is the "QWERTY" keyboard, which today remains the industry standard. Other formats have been devised, such as the Dvorak keyboard, that position keys about the keyboard in an ergonomic fashion for ease of use and accessibility. These alternative formats primarily seek to increase speed of typing and accuracy, as well as to reduce wear on the user.

Generally, all of these traditional keyboards provide an individual key for each letter of the alphabet. In addition to the letter keys, function keys are provided, such as ALT, CTRL, SPACE BAR, ENTER, and so forth. Consequently, the keyboards are congested with numerous keys and require a great deal of space. Likewise, these conventional keyboards require the user to memorize or be able to locate a particular key for each character the user would like to select.

Other keyboard layouts assign more than one character to a key, usually referred to as multiple letter key or double-touch systems. These systems, however, require the user to operate multiple keys in order to select a single desired character. Systems that require concurrent operation of multiple keys, such as shown in U.S. Pat. No. 4,891,777, are sometimes referred to as chord systems. The chord systems require the user to expend twice the effort for each letter to be selected. In addition, these chord systems require the user to be able to remember 26 key combinations, one for each letter of the alphabet.

Other multiple key systems require the user to operate specific multiple keys in a successive manner. U.S. Pat. No. 5,062,070, for instance, shows a system in which multiple characters are provided for each key. However, in order to select the particular character desired, the user must make at least two successive keystrokes. Thus, the user must remember 26 different combinations of successive keystrokes, one for each letter of the alphabet. U.S. Pat. No. 5,007,008, on the other hand, provides a keyboard in which the user must scroll through each of multiple letters that are assigned to a single key by repeatedly depressing that key.

As a result of having to enter multiple keystrokes to select a single character, these double-actuation or multiple letter key systems are slow, tiresome, and prone to typographical errors. Accordingly, these systems are primarily used where a reduced keyboard size is of utmost importance, as opposed to speed and accuracy.

Another variation of typing, called abbreviated typing, involves only having to type part of a word. U.S. Pat. No. 4,459,049, for instance, shows an abbreviated typing system in which the user only needs to enter four or less characters. The system will then search for the abbreviated word in memory. When the abbreviated word is located, the full word is entered into the document.

All of these keyboard systems are difficult to use and even more difficult to learn. Consequently, typing is slower and prone to mistakes. Moreover, these keyboards are all the more difficult to operate by persons that have not learned to use that particular type of keyboard. These "hunt and peck" typists must search for the desired characters, which are often arranged in a non-alphabetic order and amongst a great number of keys.

Another type of keyboard entry is encountered on telephones that are used to access remote systems, called automated response systems. Generally, these automated response systems will recognize alphabet characters associated with a key depressed on a remotely located telephone keypad. One such system, for instance, is employed by the U.S. Supreme Court, wherein users simply dial the Supreme Court phone number in order to locate the docket number or status of a pending case. The user may call into the system from any conventional remote phone location. Once the Supreme Court automated response system is accessed, the user is prompted by voice message to specify the name of the case by depressing keys on the remote telephone keypad. Pursuant to current instructions, the user then proceeds to enter up to ten alphabetic characters of the name of one of the parties to the case on the keypad of the remote telephone. The conventional telephone keypad consists of twelve keys, 0–9, *, and #. Multiple letters are associated with each of numerical keys 2–9, so that all 26 letters are accounted for except for Q and Z, which the system specifies as being assigned to numerical key 1. The user then depresses ten numerical keys corresponding to the name of one of the parties. Or, the user may enter less than ten digits followed by the * key or a four-second delay. Once the party name has been entered, the system then searches the clerk's office docket and provides a voice indication of the three closest cases that have been located by case number, parties, and status. If the user is not satisfied with any of those cases, the user may speak with a docket clerk.

The automated response system described above is designed to accommodate conventional telephone keypads, with limited words in memory and are not implemented in a word processing environment. Consequently, the system is extremely slow and not readily adaptable for use as a speed typing arrangement. Moreover, the system is limited to use with voice communication systems and with telephone keypads. Consequently, the automated response systems do not provide for editing memory, defining preferred terms, or defining new word variations. In addition, the telephone keypads are not designed for typing, much less speed typing.

SUMMARY OF THE INVENTION

The present invention relates to a system and method for rapid typing using a keyboard which has multiple characters assigned to some or all of the keys, so that fewer than 26 letter keys may be utilized. For example, all 26 letters of the alphabet may be assigned to 4, 6, or 8 keys. Each such key on the keyboard is associated with a numerical digit whereby one or more series of digits form a code. The system uses the numerical code to access a dictionary or table of words stored in the computer's memory at a memory location corresponding to the numerical code. The system may display all of the words available to the user in response to the input code. If more than one word is responsive to the coded numerical sequence, the user then selects one of the available words to be placed in the document.

The user is further given the option of selecting a preferred word or words to be associated with any given numerical code. When that code is typed in, the computer will display all words, with the preferred words displayed in ranked order. The user, however, may optionally select to display only the preferred word or words.

In addition, the user may be given the option of having the words associated with any given numerical code displayed in different ways, such as (1) in accordance with an order or degree of preference which the user defines, (2) in accordance with a predefined preference list which gives a higher ranking to those words that are the most commonly used, (3) in alphabetical order, or (4) in accord with special predefined categories of usage, such as legal or scientific terminology. The user has the option of having the priority list adjusted automatically based upon the selection of words made by the user when designating the desired word from the group of words with the same numerical code.

A further feature of the invention is that the user may select between a range of keyboard configurations, such as 4, 6, 8, or 12 letter keys to which are assigned the 26 letters of the alphabet. Also, the system will complete and display lengthy words before the user has finished typing them on the keyboard. The invention is preferably implemented on a traditional QWERTY keyboard, wherein multiple letters are assigned to the row of number keys, 0–9, along the top row of the keyboard, or to the rectangular grid of numerals commonly located to the right side of the keyboard or the horizontal rows of keys to which letters are conventionally assigned. In addition, a specially-designed keyboard, which plugs into a computer, is also shown to implement the invention. The provision of fewer keys makes the special keyboard particularly better suited for use by persons with physical disabilities, and may be used in place of, or in conjunction with, the traditional keyboard.

Accordingly, it is an object of the present invention to provide a system for faster typing using a keyboard easier to remember and having as few or as many keys as the user desires.

It is a further object of the invention to provide a speed typing system that may be utilized with a compact keyboard that is not congested with excessive keys.

It is another object of the invention to provide a keyboard that has multiple letters per key, yet only requires a single touch to select a desired letter key.

It is still a further object of the invention to provide a keyboard for speed typing that is ergonomic, reduces wear on the user, and easy to learn, and increases accuracy and efficiency.

It is another object of the invention to provide a typing system that is easy to use for persons with disabilities, such as arthritis.

These together with other objects and advantages which will become subsequently apparent when reference is made to the drawings and description hereinbelow.

DETAILED DESCRIPTION OF THE PREFERRED EMBODIMENTS

Figure 1:
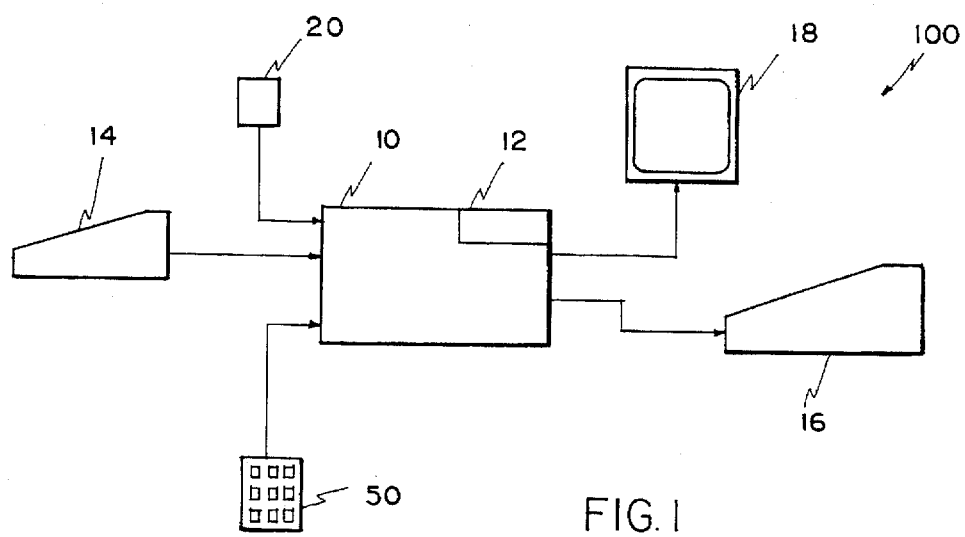
FIG. 1 shows an overall preferred embodiment of the word processing system of the invention in block-diagram format.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Turning to the drawings, FIG. 1 shows the speed typing system 100 in accordance with the preferred embodiment of the invention. Generally, the system 100 comprises a computer 10 having a microprocessor, internal memory 12, and associated input/output components well known in the word processing art. A conventional expanded keyboard 14, printer 16, and display 18 is provided in a conventional manner. In addition, a separate specially designed keypad or keyboard 50 may be optionally utilized in a manner to be described. The word-processing system is controlled by programmed instructions within the computer which recognize operator-initiated keystrokes and subsequently display and print the text. The software instructions will be modified from conventional instructions to perform the functions of the present invention. The software to perform the functions of the present invention may be within the pre-programmed instructions of the word processing system or stored on a disk for input into the computer and may be linked by conventional interfacing techniques to all major word processors in a manner well known in the art, such as by Dynamic Database Enhancing or Object Linking and Abetting or Standard Interface.

Although system 100 is shown as consisting of separate components, the system 100 may be implemented in a variety of manners, such as in a hand-held computer 10 with memory 12 which is integrated with a keyboard 50 and display 18. The hand-held computer may be remotely located with its output either directly wired or transmitted wirelessly to the computer. The invention is designed so that the user may decide to use some of the lettered keys of a conventional keyboard or the numbered keys of a conventional keyboard, which are generally located along the top row of the keyboard or along the right hand side of the keyboard. Likewise, the invention may be implemented on a touch-screen monitor, by a toggle-type control lever resembling a joystick in appearance, or by other like input devices. The keys may be still further be mounted on a portable keyboard in which the finger keys press inward in one direction and a thumb-operated key is mounted on the side of the keyboard and is pressed inward by the user's thumb.

Figure 2A:
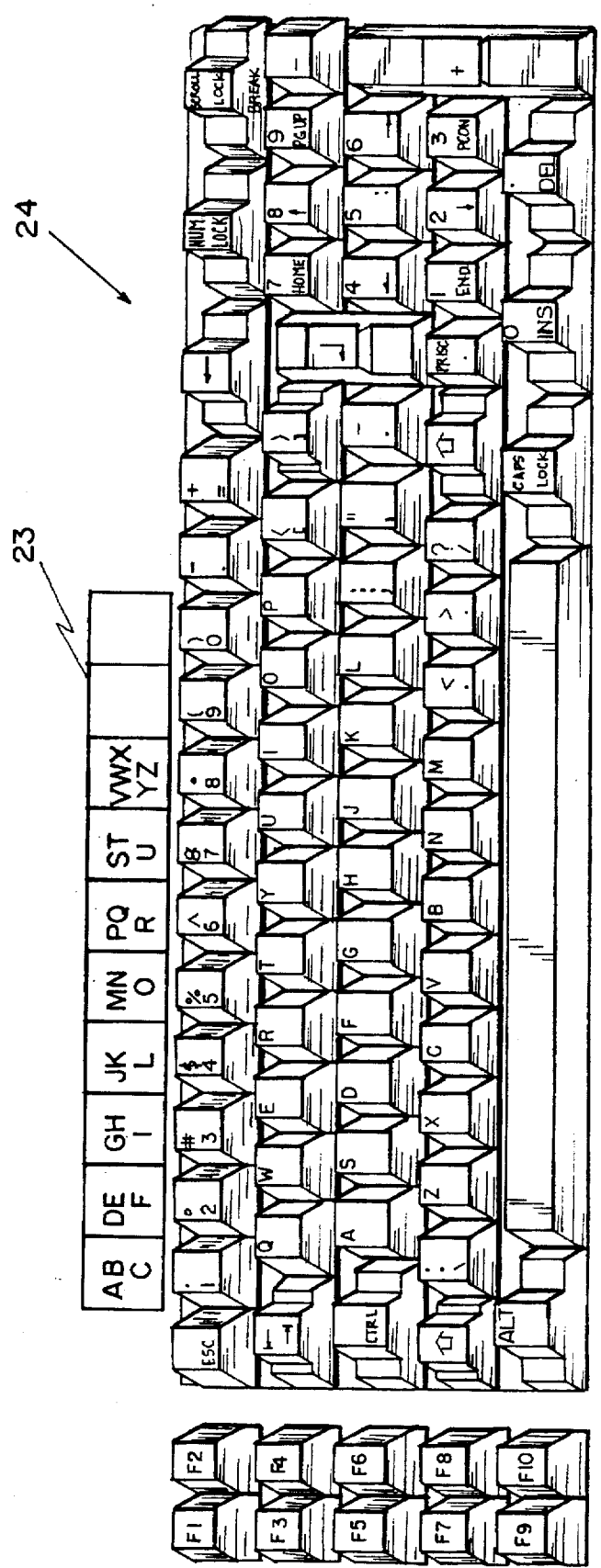
FIG. 2(a) shows an 8-key configuration as implemented on the top numeral row of a standard QWERTY keyboard in accordance with the preferred embodiment of the invention.

FIG. 2(a) shows a traditional expanded QWERTY keyboard 14 used to implement the present invention in accordance with the preferred embodiment of the invention. Keyboard 14 has 10 numeral keys along the top row and 10 numeral keys along the right hand side of keyboard 14, each labelled from 1–9 and 0. An overlay 23 is shown above the top row of numeral keys, indicating letter characters to be assigned to each of the corresponding numeral keys. In addition, stickers (not shown) having multiple letters may optionally be mounted to the numeral keys located on the right portion of keyboard 14 or on keys that are conventionally marked with a letter.

In one of the preferred embodiments, the standard keyboard is an 8-key configuration, wherein numeral keys 1–7 are each alphabetically assigned 3 letters, and numeral key 8 is assigned 5 letters, as shown by the overlay 23. The number assigned each numeral key is used as an input element code or numerical code that is associated with the corresponding letters.

Figure 2B:
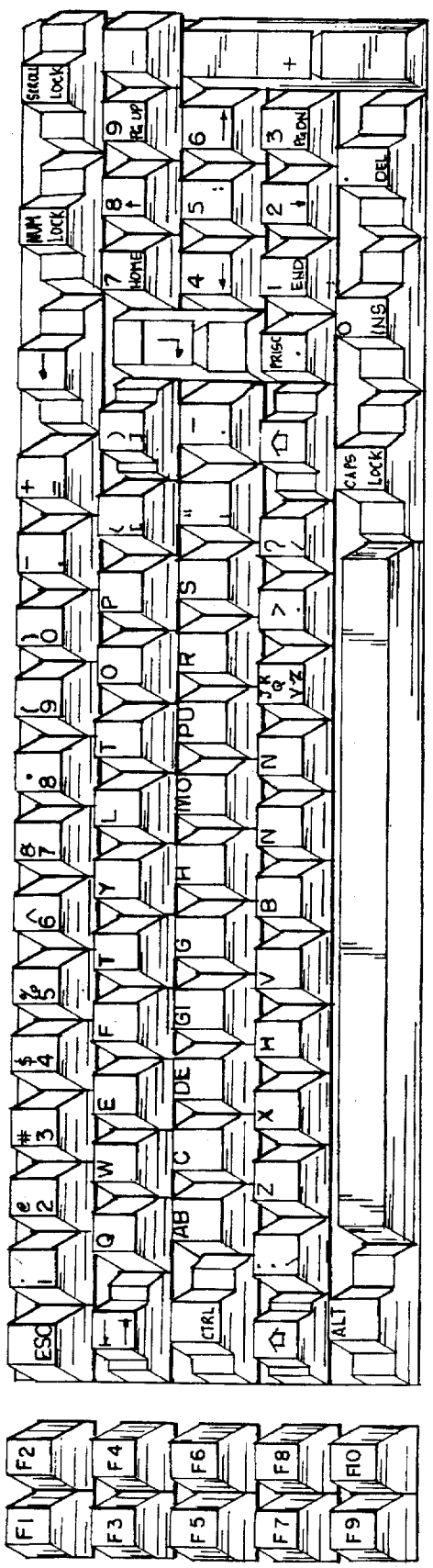
FIG. 2(b) shows a 14-key configuration as implemented on the conventional character row of a standard QWERTY keyboard in accordance with the preferred embodiment of the invention.

Another embodiment, corresponding to a 14 key configuration, is shown in FIG. 2(b), where the conventional letter keys "a", "s", "d", "f", "t", "c", "j", "u", "n", "i", "k", ",", "l" and ";" are redefined as shown. The keys range from having a single letter, to as many as 8 letters for a single key. This embodiment preferably places a vowel with a consonant rather than a consonant with a consonant. Vowels and consonants are usually not interchangeable in a given sequence of letters which are arranged to form a word and two consonants, so that the configuration results in a fewer incidence of words having the same code. In addition, the most commonly used letters are provided a separate key that is easy to reach. Likewise, the least-used letters, or letters having little duplication of the same code, are grouped on a single key that is generally not as conveniently positioned.

Figure 3:
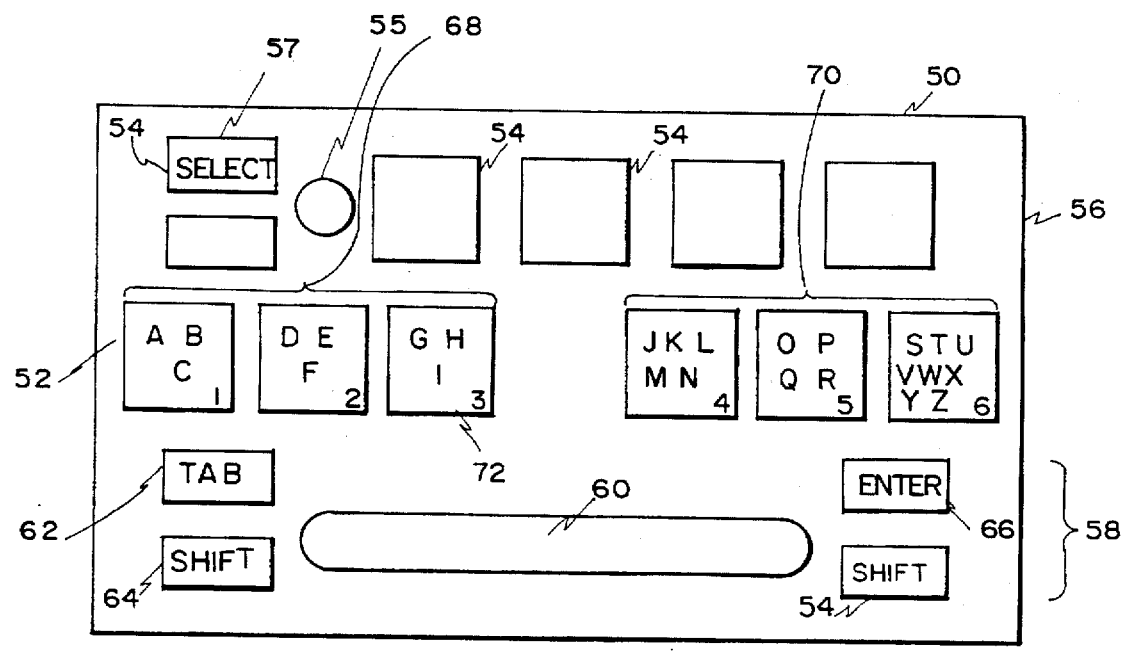
FIG. 3 shows a 6-key configuration of a specially designed keyboard in an alternative embodiment of the invention for use with the system of FIG. 1.

FIG. 3 shows one example of a specially designed keyboard 50 corresponding to a two-handed 6-key configuration. Keyboard 50 generally comprises alphabetic or letter character keys 52 and function keys 54. Letter character keys 52 are provided in the middle row of keyboard 50, while function keys 54 are provided along the top and bottom portions 56, 58, respectively, of keyboard 50. In addition, a cursor controller 55 and select button 57 are provided along the top portion 56 of keyboard 50. Keyboard 50 may be arranged in any manner suitable to other keyboards, such as the keys being aligned in an arcuate shape. Keyboard 50 interfaces with the word processing computer 10 in a conventional manner (not shown).

The function keys 54 may correspond to any suitable function to be performed. Preferably, however, the bottom row of function keys 54 comprise for instance, SPACE BAR 60, TAB key 62, SHIFT KEY 64, and ENTER key 66. The top row 56 of function keys 54 may correspond to numbers or characters, cursor movement keys, definable function keys, or keys having other like operations. In addition, keyboard 50 may be used in conjunction with expanded keyboard 14. Expanded keyboard 14 would supply any of the numerical or function keys 54 not provided by keyboard 50. Accordingly, the expanded keyboard 14 is optional, although it complements special keyboard 50 by providing the full spectrum of traditional function and character keys.

Letter keys 52 are divided into two groups 68, 70, each group having three keys. Three characters are assigned to each of the keys 52 of the left group 68, which are preferably imprinted on the key, though may be located on an overlay (not shown). The left key 52 has letters A, B, C; the middle key 52 has D, E, F; and the right key 52 has G,H,I. The right group 70 of keys 52 each have from four to eight characters: the left key 52 has J, K, L, M; the middle key 52 has O, P, Q, R; and, the right key 52 has S–Z.

Each letter key 52 is further assigned a numerical digit corresponding to a numerical or element code 72, which is imprinted on the bottom right side of the key 72. The purpose of the numerical code will become more apparent below. The left group 68 of keys 52 are designed to be used by a user's left hand and the right group 70 is for use by the right hand.

As depicted in each of FIGS. 2 and 3, the letters are generally arranged alphabetically along letter keys 52, from left to right. This configuration makes it easier for a user to learn and memorize the location of keys and for "hunt and peck" typists to find a desired key. However, the letters may be formatted in any suitable manner, such as based upon frequency of use, with less frequently used letters either grouped together or interdispersed with more frequently used letters. The computer may further be configured to maintain a tally of the word usage and determine the most frequently used letters and words for that user and the information may be further used to automatically place terms in rank order of priority in memory, as will become more apparent below. Still yet, letters may be grouped together which have similarities in appearance in order to assist recollection of location by the user.

In addition, the keyboard configurations may range from more than 16 letter keys (where each key corresponds, in most cases, to two letters, though may ranged from 1 to 3 or even 4 letters per key) to as few as 4 letter keys (where three keys may for example correspond to eight letters each, and one key may include only two letters), though other possibilities are equally practical. As will become more apparent below, the greater the number of keys, the less editing or other interaction that will be required by the user. However, typing will be slower and more difficult to learn since there are more key locations. Likewise, the fewer the number of keys, the easier the system will be to learn and type, but the more editing that will be required of the user.

Now turning to FIG. 4(a), a functional flowchart of the invention as implemented by programmed instructions stored in the computer memory 12 or from a floppy diskette will now be described. The system 100 starts at block 102, where the system formats itself. In formatting, each key is preassigned a particular set of letters and a numerical digit or code 72 according to the designated keyboard configuration. For instance, the preferred default keyboard configuration is the 8-key configuration of FIG. 2(a). Accordingly, eight keys 52 are assigned the digits 1–8, from left to right, respectively. In addition, each of letters A, B, C are assigned to numerical digit or code 1; letters D, E, F are assigned numerical code 2; and so forth. Thus, when a letter key 52 is depressed on keyboard 14, the equivalent numerical code 72 is recognized by the computer 10 at step 104.

The standard eight key format may be changed by the operator in accordance with the system design. That is, the system may display alternate format choices to the operator, such as using 4, 6, or 13 keys, which the operator may select. Each format is accompanied by a corresponding overlay 23.

After format selection, typing may begin. The operator types out a word and the key depressions are read, step 104. A numeral associated with each key is read and stored as it is depressed until the operator strikes a key that indicates the user has reached the end of the word to be typed, step 106. For instance, if the character is a punctuation mark, space, or carriage return, the system will determine that the word is complete and proceed to step 108. Otherwise, the system returns to step 104, where the system awaits the next character to be entered.

Figures 5, 7:
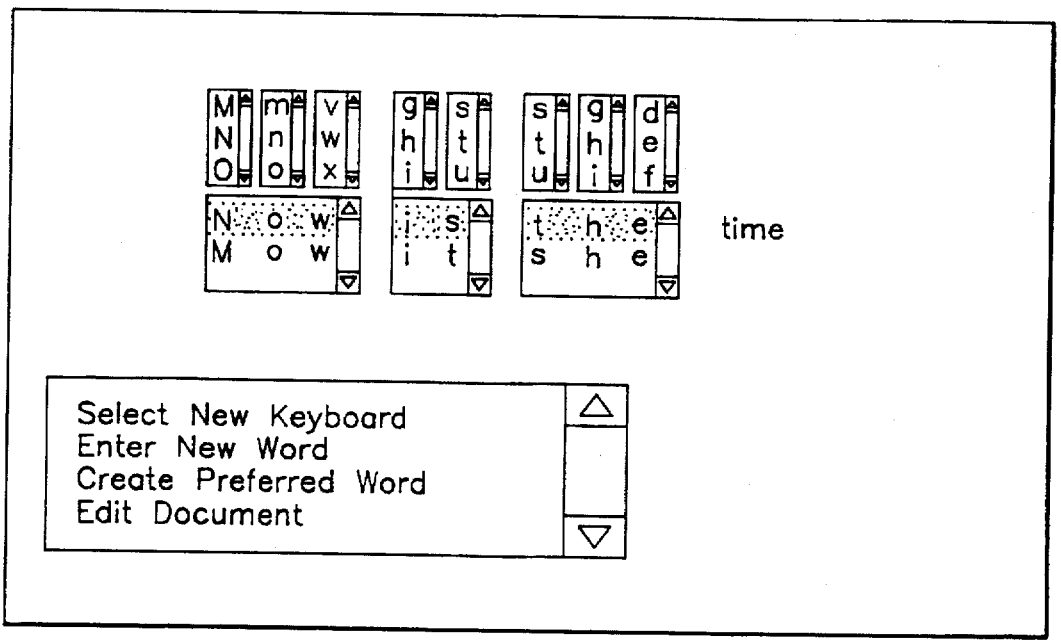
FIG. 5 shows the output of the invention for the monitor of FIG. 1 in accordance with the preferred embodiment of the invention.
FIG. 7 shows the output of the invention for the monitor of FIG. 1 in accordance with an alternative embodiment of the invention.

As the word is typed, the display unit preferably displays each of the letters associated with each key that is depressed. For example, as shown in FIG. 5, if the key "1" is depressed a linear column or row displaying "ABC" is displayed. Alternatively, nothing may be displayed, or the numeral "1" may be displayed. Still further, only an asterisk or other symbol may be displayed. These display symbols will automatically be erased when the system determines that the typed word is accepted or when the user erases it so that he can enter another word.

Once the entire word has been received, the system will search the memory 12 by comparing the numerical value of the input code with a table of word codes stored in memory 12, step 108. An example of several numerical or word codes 72 are shown, for instance, in Table 1 for the standard 8-key configuration of FIG. 2(a). As shown in Table 1, each numerical code 72 is stored in a specific memory location, with each memory location having a list of one or more words. The word codes are formed from one or more input element or numerical codes. Accordingly, every word in the dictionary is stored in the table memory as associated with a particular code. The memory may be configured from any standard word-processing dictionary or like system.

TABLE 1

| Code | Preferred Words | Words |
| --- | --- | --- |
| 5-5 | | no |
| | | on |
| 5-5-8 | now | now |
| | | mow |
| 5-5-8-7 | | mows |

In addition, fewer than every word in the dictionary may be stored in the table memory. For instance, the user may select a limited category of information corresponding to limited functions that have a more finite vocabulary, such as for composing business letters or scientific papers. The reduced dictionary diminishes the memory requirements, as well as the time needed for the computer to search the memory. Likewise, less interaction would be required by the user since there are fewer codes in memory, each code further likely to be associated with fewer words.

If the input numerical code is located or found in the memory table, step 108, the system proceeds to step 118. At step 118, the system will check the memory location to determine if more than one word, i.e. multiple words, are associated with the particular input code. If, however, no words are found in memory at step 108, the user will have the opportunity to correct any misspelling of the word, step 109. If the user determines that the code was entered incorrectly, step 109, the user may go back and re-enter the code, step 104. Correction of a misspelling is performed in accordance with the standard word processing operation, such as by erasing the typed code where necessary and entering the new text code. After making the correction, the system determines if a code has been found in memory for the corrected word, step 108.

Assuming, on the other hand, that there was not a typing error, the user may add words in memory, step 110, by adding a particular word to the dictionary memory corresponding to the numerical digits selected. The user selects the new word by highlighting the proper letters among the group of letters displayed above the home row being typed. Once all the letters of the word are highlighted, the user hits ENTER, and the computer stores the new word in the memory location corresponding to the associated numerical code. If the user elects to add the word in memory, the memory is updated, step 112. The selected word is then displayed in the text of the document, step 114, and the system then returns to step 104, where it awaits the next key to be input, step 117.

If, on the other hand, the user does not add any word in memory, step 110, instructions are displayed, step 116, and the system returns to wait for the next key, steps 117, 104. The instructions may indicate, for instance, that no word has been located and the user should determine whether there was a typographical error or if the user wishes to define a new word. Thus, the message may read "check spelling" or "code not recognized". Or, the system may display words corresponding to the closest code and indicate that no exact match has been found.

If there is at least one word stored in memory that is associated with the input code at step 108, the system will proceed to step 118. At step 118, if only a single word is stored in the memory location associated with the input code, the word will be displayed, step 120. The user will have the opportunity to change (i.e. add or delete) the word stored in memory, step 122, if, for example, the word in memory is not the word desired to be displayed. As in step 110 above, the memory is updated to include, or omit, the changed word, step 124, the new word is displayed, step 126, in place of the originally displayed word, and the system, at step 127, returns to step 104. If no words are modified at step 122, indicating that the displayed word is correct, the system, at step 127, will return to step 104.

The process of changing the words in memory, steps 110, 122, 152 (as will be discussed below), allows the user to update the memory for specially defined words that are not normally included in a standard dictionary. For example, a proper noun might not be in a dictionary memory and thus the operator may want to change or add the proper noun to the memory for that particular code. Thus, the user may incorporate proper nouns, technical terms, abbreviations, and so forth, into the computer memory. This is done in any suitable programming manner, such as by simply appending the new word into the memory location associated with the given code. In addition, the user may modify the memory so as to later omit terms that were previously incorporated into the memory.

Assuming that there is more than one word in memory, step 118, all the words are displayed, step 142, with any preferred words being displayed at the top of the list of words. The user then has the option of selecting a word, step 144, creating preferred words, step 148, or including a new word in memory that corresponds to the code, step 152.

If the user selects a word among the words displayed, step 144, the selected word is displayed, step 146, and the system returns to await the next input character, steps 147, 104. However, if no word is selected, step 144, the user may wish to create preferred words, step 148. At step 148, the user may define a displayed word or words as being a preferred word to be listed at the top of the list, step 148, or in a certain rank order. If the preferred words are modified, step 148, the memory is updated, step 150, the word is displayed, step 146, and the system again returns to step 104, step 147.

The preferred words are those words that have previously been selected or designated by the user as terms which are most frequently used. The system may also be configured with the words predefined as being preferred words. As shown in Table 1, for instance, the term "now" is defined as the preferred term for code 5-5-8. Though the preferred terms are shown as a separate list in memory Table 1, they may simply be flagged as a preferred term and stored with the other words for that memory location.

Finally, if the user does not select a word, step 144, and does not change the list of preferred words, step 148, the user may change, i.e. add to or modify, the words in memory, step 152. For example, as discussed above, the desired word may be missing among the displayed words, or the user otherwise wants to include a new word to be associated with the input numerical code. If so, the memory is updated at step 150 to reflect the new information, and the new word is displayed, step 146. The system then returns to step 104, where the system awaits a new character to be input, step 147.

If the user does not select a word, step 144, create a preferred word, step 148, or change a word, step 152, an instruction message will be displayed, step 154. The system will then return to step 104, where it will wait for the next key to be typed, step 147.

Now turning to FIG. 4(b), an alternative embodiment of the flow chart of FIG. 4(a) will be discussed. As a standard practice, the system will display all the words in the manner shown in FIG. 4(a), with the preferred words displayed at the top of the list of words. However, FIG. 4(b) now allows the user to first display a list of only the preferred words. If the desired word is not found among the preferred terms, the user may then decide to see a list of all the words.

Figure 4A:
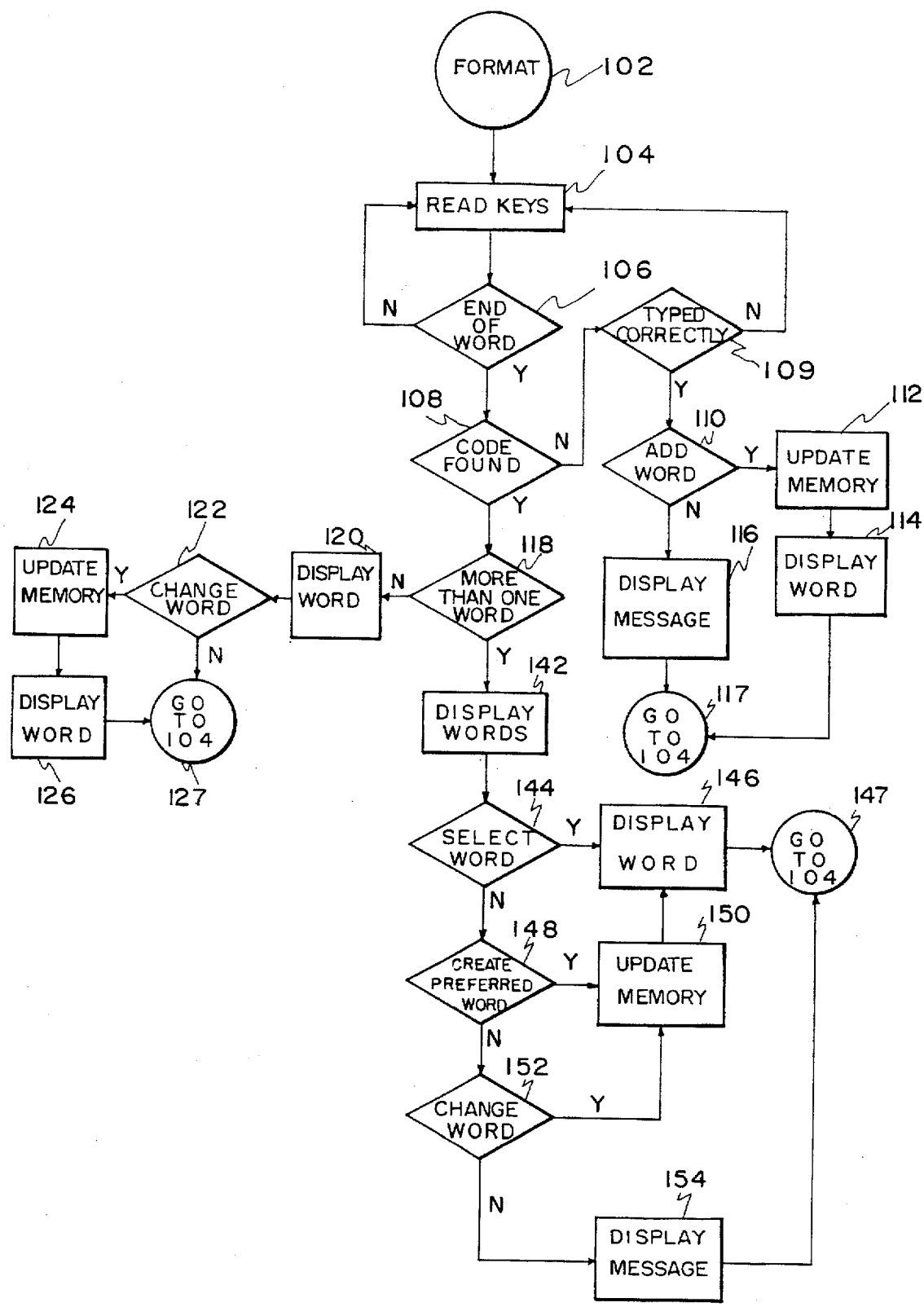
FIG. 4(a) shows a flow chart in accordance with the preferred method of operation of the system.
Figure 4B:
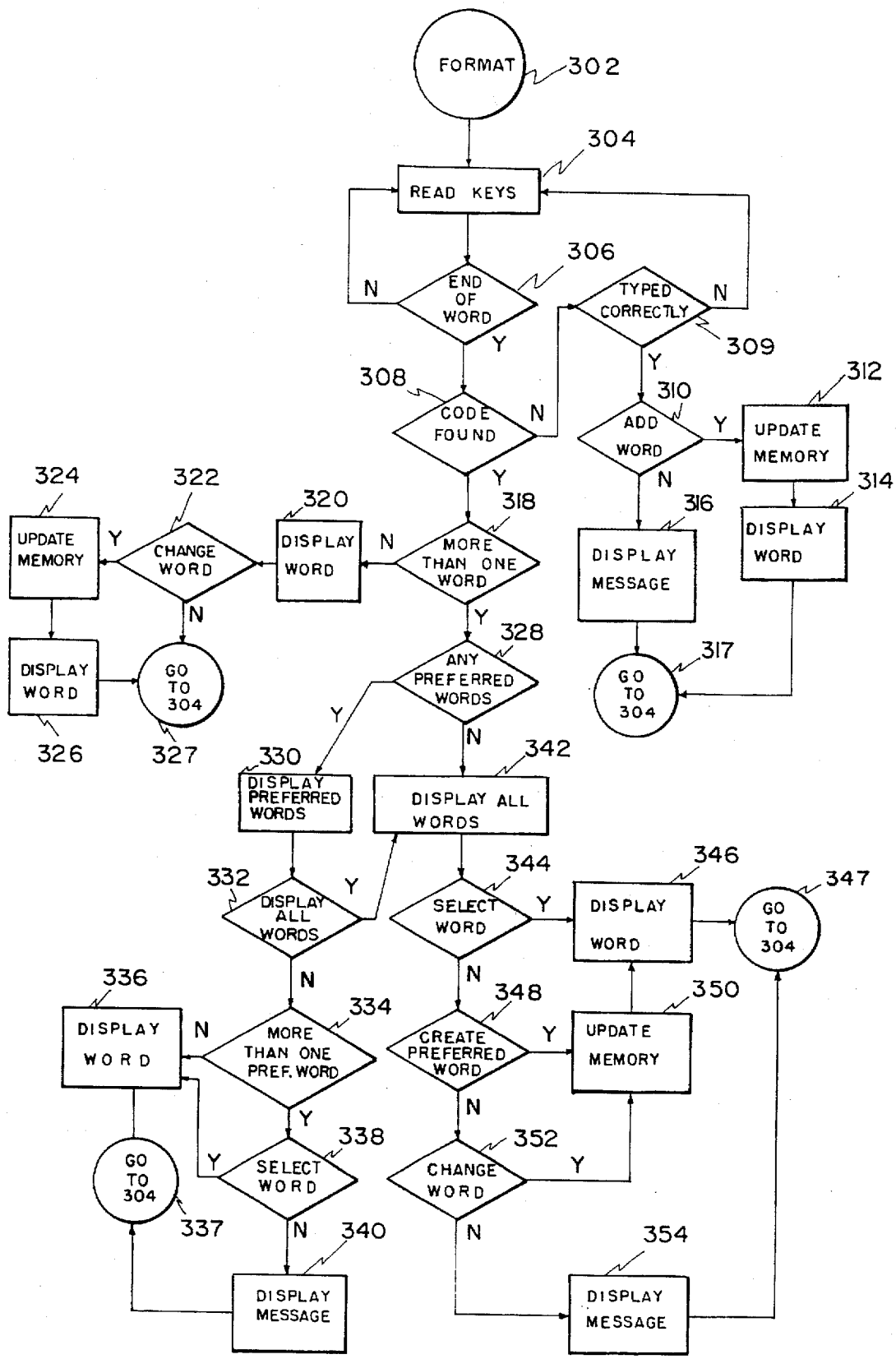
FIG. 4(b) shows a flow chart in accordance with an alternative method of operation of the system.

Accordingly, steps 302–327 of FIG. 4(b) are similar to steps 102–127 of FIG. 4(a). Picking up at step 318, however, the user now has the election to first display a list of only the preferred words. Thus, if there is more than one word stored in the memory location associated with the input code, as verified at step 318, the system will next check for a list of preferred words, step 328. If preferred words are stored in memory, the system will display any preferred words associated with that input code, step 330. An asterisk or message will be displayed along with the preferred words so that the user knows that additional words are available aside from only the preferred terms displayed.

The user may, after reviewing the list of preferred terms, step 330, decide to see the entire list of words, step 332, after which all the words are displayed, block 342, offering the operator various choices as will be discussed below. If all the words are not to be displayed, the system then determines if there are multiple preferred words stored in memory, step 334, and, if so, the user may pick among the preferred words, step 338. If a word is selected, the selected word is displayed, step 336, and the system returns to await a new keystroke, steps 337 and 304. If no word is selected, a message is displayed, step 340, and the system returns to receive the next key, steps 337, 304.

Returning to step 332, if the user selects to display all the words stored in memory, step 332, or if there were no preferred words to begin with, step 328, all the words will be displayed, step 342. Accordingly, all words in the appropriate memory location are displayed on monitor 18, step 342. Once the words are displayed, step 342, the user then has the option of selecting a word, step 344, creating a list of preferred words, step 348, or including a new word in memory that corresponds to the code, step 352.

Steps 342 to 354 are essentially similar to steps 142 to 154 of FIG. 4(a). At step 348, however, the user may define a displayed word or words as being preferred words or otherwise view and modify the list of preferred words or create a new list of preferred words, step 348.

Referring now to FIG. 5, an example of the operation of the invention will be described with reference to FIG. 4(a). The monitor 18 is generally shown as having a main screen 22 on which the output is displayed. Suppose, for instance, that the user desires to type the phrase "Dear Tom, Now is the time for all good men to come to the aid of their country". After the computer formats, step 102, the user would begin typing the word "Dear" by striking the key sequence 2-2-1-5, which is recognized by the system at step 104. As each keystroke is made, the letters associated with each key are displayed on the screen 22.

The letters are preferably displayed vertically upward, above the home row 25, which is shown as the center row. The home row is the line below the letters displayed for each keystroke. It is the row in which the word of highest preference is displayed. Below this row is the list of words with lesser priority. When a word from below the home row is selected, it is moved into the home row.

For a large number of letters assigned to a particular key, the user can elect that the system limit the letters displayed to the first three or four. An asterisk is then provided to indicate to the user that other letters are available to be scrolled. Referring to FIG. 5, for instance, when the user depresses key 8 for the letter "w", the letters "v", "w", and "x" are displayed. An asterisk is also displayed, indicating that additional letters, "y" and "z", have not been displayed.

Suppose now that the user has finished typing the word "Now", by striking codes 5-5-8. Once 5-5-8 is entered, the user would then depress space bar 60, indicating to the system that the word has come to an end, step 106. At that point, the system 100 would search the memory and recognize the input code 5-5-8 as corresponding to one of the codes in memory 12, as depicted in Table 1, step 108.

In an alternative embodiment, the numerical code may be searched as the user strikes each key. Thus, when the user strikes 5 for "N", the memory will scroll past all numerical codes starting with 5. When the user next strikes 5 for "o", the memory will scroll to numerical code 5—5. (At this point, though the user hasn't completed typing that particular word, the currently available words "no" and "on" may be displayed on screen 22.) When the user next strikes 8 for "w", the system need only scroll down a short distance to locate the proper code, 5-5-8.

Continuing with our example at step 118, the system will recognize that there are two words, "now" and "mow", associated with code 5-5-8. In addition, the system will then determine that the word "now" has been marked as a preferred word. Thus, the word "Now" is displayed on screen 22 in the home row 25 and highlighted. In addition, the word "Mow" is displayed below "Now", as shown in FIG. 5. The user may display all words in any suitable manner, such as by selecting the function from a pull-down menu. The words associated with the input code are preferably displayed downward starting at the home row 25. The user may then scroll down to highlight one of the words displayed, such as "Mow" by using scrolling keys on keyboard 14 or 50, mouse 20, or cursor controller 55, step 144. Once the appropriate term is highlighted and the user depresses the ENTER key, the selected term is displayed on screen 22, step 146, and the system returns to wait for the next key, steps 147, 104.

An example of scrolling downward is shown in FIG. 5 for the code 3-5-5-2. After the full code is entered, the words "gone", "home", and "good" are displayed downward, with the term "gone" being in the home row 25. At the point shown in FIG. 5, however, the user has scrolled downward to highlight the term "good". Once "good" is highlighted, and the ENTER key depressed, the words "gone" and "home", as well as the letters, are removed from the display. In addition, the term "good" would be displayed in home row 25, without being highlighted, as shown for the words "for all".

The user may further decide to add a new word to memory, step 152. For instance, suppose the user inputs code 7-5-5 for his name, "Tom", as shown in FIG. 5. A standard dictionary memory may not have the proper noun word Tom, but does have other words for that codes, including "Ton" and "Son". As described above, all letters for code 7-5-5 are displayed on screen 22 as the respective keys are depressed. In addition, in the absence of any preferred terms, the words "ton" and "son" are also displayed on screen 22. In order to define the new word, the user then highlights the letters used to form the new word, "Tom", as shown in FIG. 5. Once all of the letters are highlighted, the user hits the ENTER key and the word is displayed in the home row 25, step 114, and all the letters and remaining words are removed from the display. The system then updates the memory, step 150, so that the new word "Tom" is stored in the memory location corresponding to numerical code 7-5-5. The system then returns to step 104, where it waits for the next key to be depressed.

Figure 6:
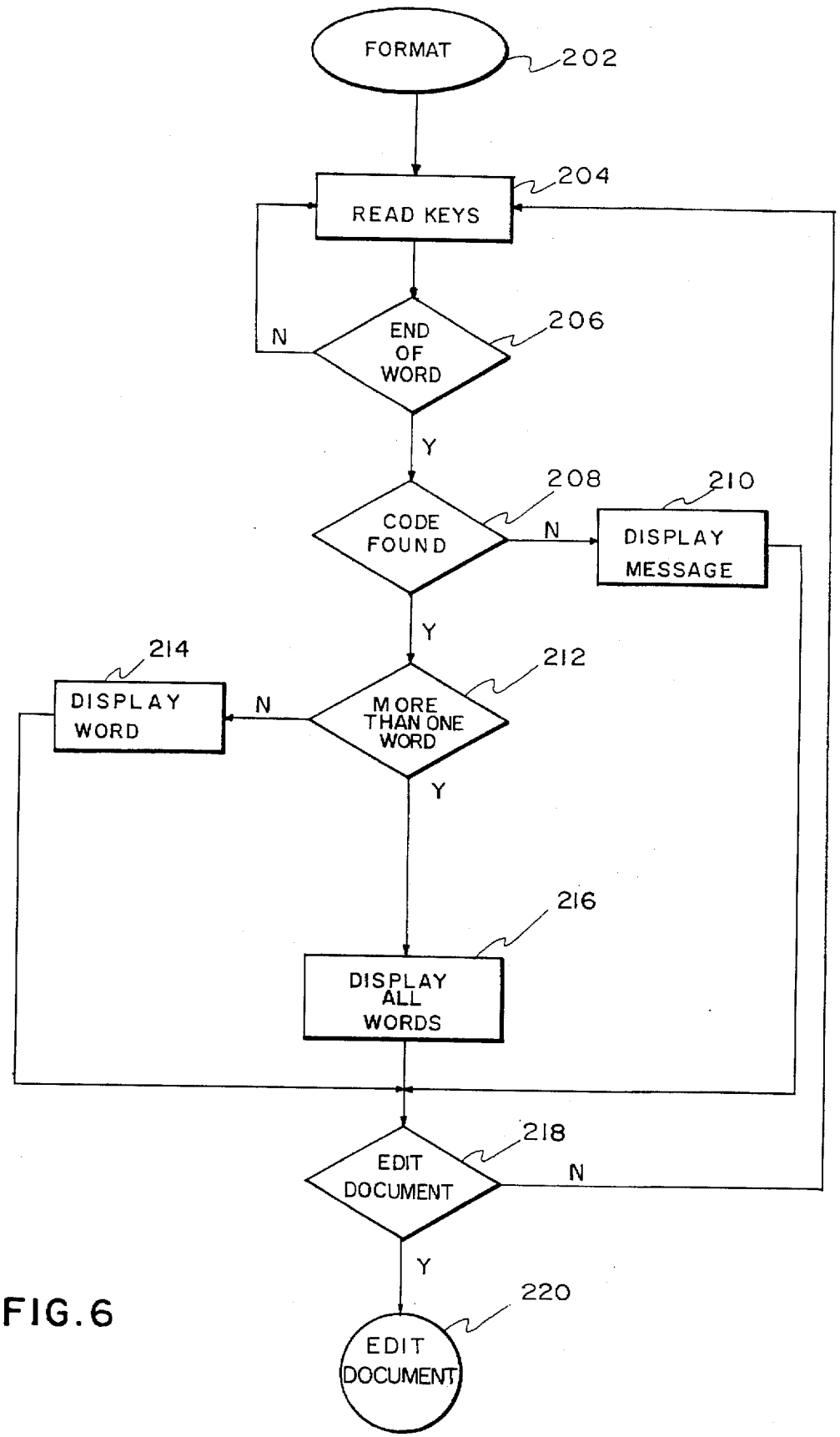
FIG. 6 a flow diagram for an alternative embodiment of the invention.

Now turning to FIG. 6, a flow chart is shown in accordance with an alternative embodiment of the invention. FIG. 6 differs from FIG. 4(a) by allowing the user to finish typing an entire sentence, paragraph, page, or document, prior to having to select the words to be finally displayed. In addition, the preferred words are now displayed in conjunction with the entire set of words, as in FIG. 4(b). Thus, instead of displaying the list of preferred words alone, the system now displays all the words, with the preferred words at the top. Long lists may be scrolled in any suitable manner.

As in FIGS. 4, the system starts out by first formatting itself, step 202, and reading keys, step 204. After an entire word is input, step 206, the system will check for the code in memory, step 208. If the input code is not located in memory, step 208, a message will be displayed, or the code will be displayed, step 210, and highlighted, to indicate no word has been found. If the code is found, step 208, and there is only one word, step 212, that word is displayed, step 214. Assuming that there is more than one word in memory, the system will display all the words, step 216, with any preferred words displayed at the top of the list. Here, however, the step of checking for more than one word, step 212, may be removed since the single word would necessarily be displayed at step 216.

After the code, word, or words have been displayed at steps 210, 214, or 216, the system will determine whether to edit or verify the document, step 218. Here, the user may select that the document is to be edited following the entry of a line of text, a paragraph, or a page and the system will remind the user at the appropriate intervals. Accordingly, after each line, sentence or paragraph of text is entered, the system will automatically prompt the user to go back and edit that line, though the user may proceed typing and edit the document at a later time.

Still yet, the user may select to edit the document at any time during the entry of text. Unless the document is to be edited, the system will return to step 204, where it awaits entry of the next key. Accordingly, the system will display alternative words and letters up until the point the document is verified.

Once the document is to be edited, the system will advance to step 220. Here, the system will proceed through each input code for which there is more than one word in memory. Where there is only one word, that word is accepted and displayed in the text of the document. Where there is more than one word, the system will display the list of words with the preferred words being listed first. The system will then prompt the user to select a word, enter a new word into the dictionary, or select a word as being preferred. This process is similar to steps 118 to 147 of FIG. 4(a) as discussed above.

In accordance with the feature of displaying the preferred words at the top of a list of all words, the user may further define a rank order in which the words are to be prioritized. This is done by the user assigning a preferred order to the list of words. Or, a rank order may be predefined by the system. Any words that have not been ranked are also displayed in alphabetical order beneath words having a greater priority. The term with the greatest priority is displayed in the home row 25. The user may then scroll down and highlight any term to be selected. If, however, the user does not select a word, the word in the home line 25, here the preferred word, is displayed in the text of the document. The system may further be configured to permit the user to select all of the highlighted words at once. As discussed above, the first preferred word is highlighted by default, at the user's option, and the user may select a different word by scrolling downward to highlight the desired word, without having to press ENTER for each individual word. If there is no preferred word, the first listed word, which is in the home row 25, is highlighted by default.

All the operational steps of the invention are implemented in accordance with well-known programming techniques. For instance, the steps of indicating a word is missing, steps 110, 122, 152, selecting a preferred word, step 148, or changing the keyboard configuration, are implemented by methods that are well-known in the programming art, such as by using a pop-up menu or display window.

In this manner, all the functions available to the user, such as to select a keyboard configuration, add a new word to memory, and so forth, may be implemented by a pull-down menu or in a display window that can be accessed at any time during operation of the invention or only at selected times. Other operations, such as updating the memory, steps 124 and 150, are also implemented by well-known programming methods, examples of which will be discussed below.

An example of implementing the invention by the use of windows is shown, for instance, in FIG. 7, in accordance with the operation of FIG. 6. A function display window is provided for the user to select among available functions, such as to enter a new word not in memory, select a new keyboard configuration, create a preferred word, edit the document, create a preferred word, and so forth. In addition, the letters and words are also displayed in scrollable windows, with the most preferred term listed first and highlighted. The non-preferred or lesser prioritized words are then displayed below the most preferred word. The preferred term, however, need not necessarily be highlighted at the user's option.

Once a word is selected, the window disappears and the word is displayed in the text of the document, such as shown for "time" in FIG. 7. Still as an alternative method of selecting words, each word may be displayed adjacent a number. The user may then select the word by depressing the number displayed adjacent the desired word.

Figure 8:
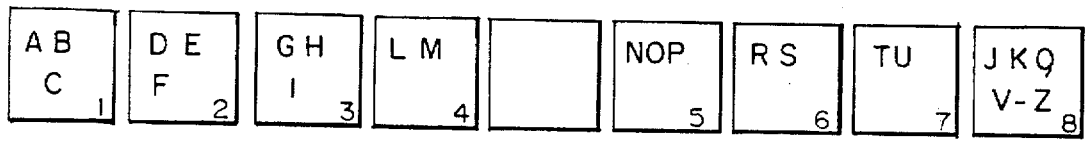
FIGS. 8–20 show alternative keyboard configurations for use with the keyboard of FIG. 1.
Figure 9:
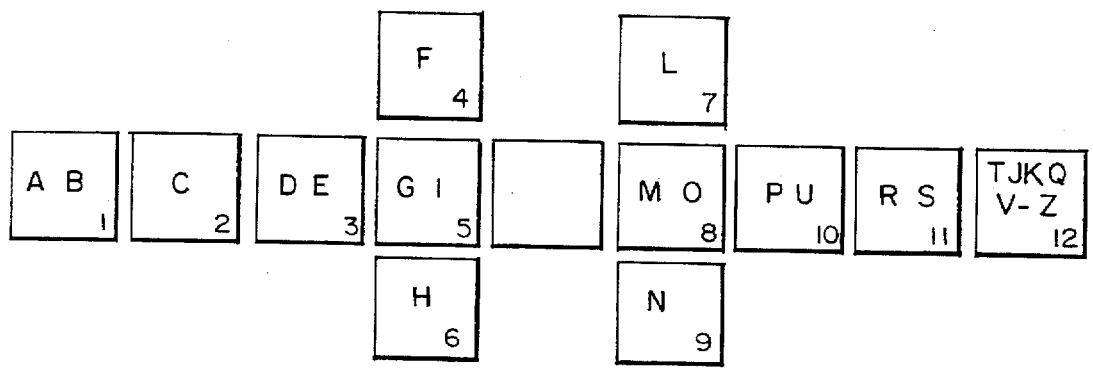
Figure 10:
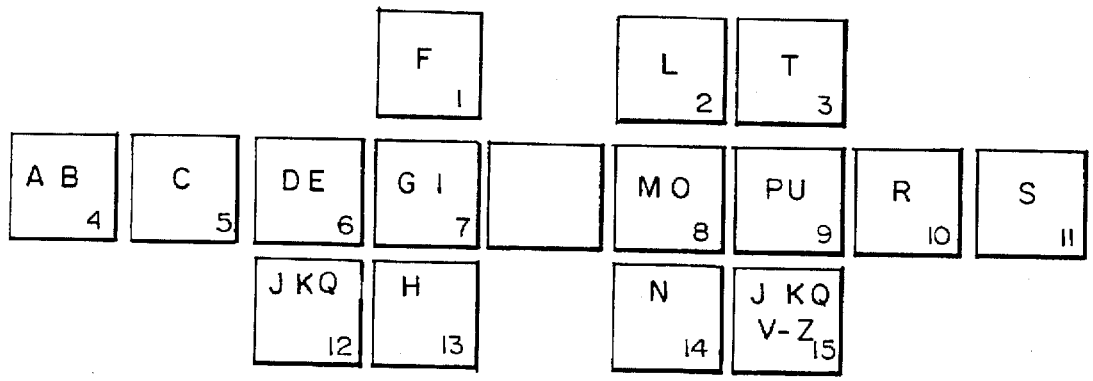
Figure 11:
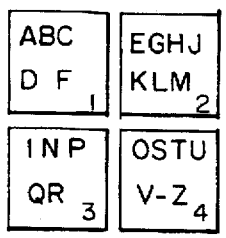

Now turning to FIGS. 8–20, various alternative embodiments of keyboard configurations are shown. These configurations may be pre-programmed into the system, or may be designated by the user. FIGS. 8–10 show examples of two-handed keyboard configurations and FIGS. 11–20 generally show examples of one-handed keyboard configurations. These embodiments have the user position his fingers over the respective keys, thereby reducing finger and hand movement and fatigue.

Figure 12:
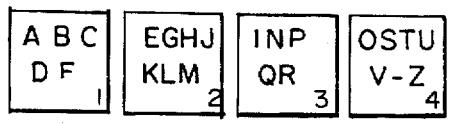
Figure 13:
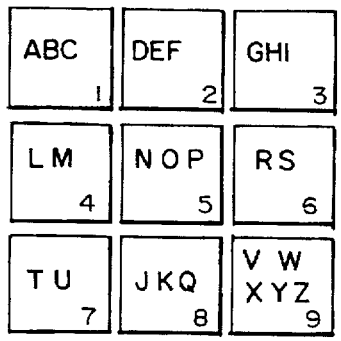
Figure 14:
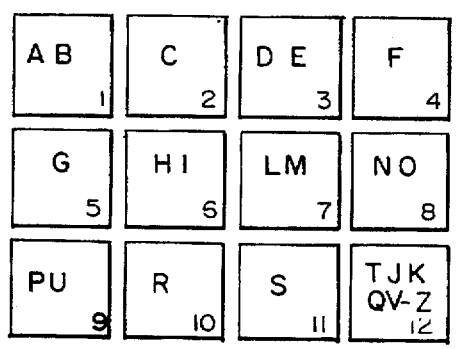
Figure 15:
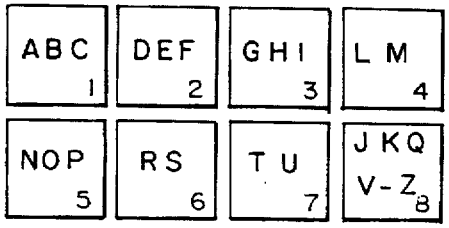
Figure 16:
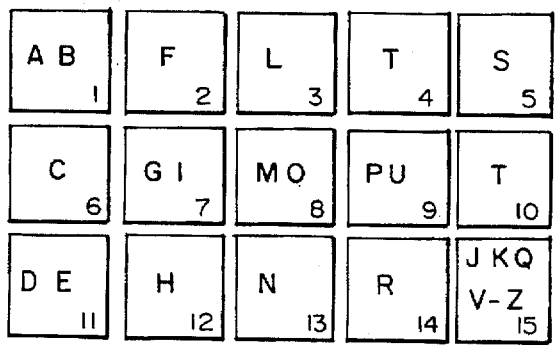
Figure 17:
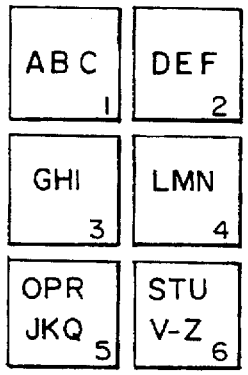
Figure 18:
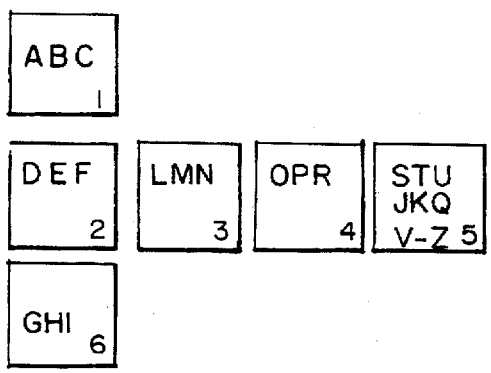
Figure 19:
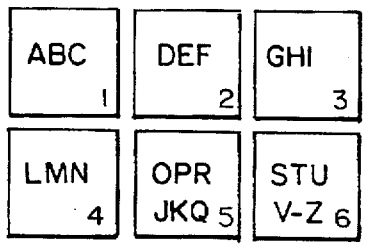
Figure 20:
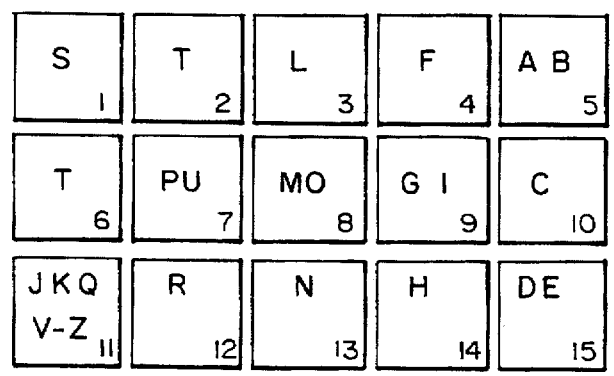

The configuration shown in FIG. 10, corresponding to a 14-key keyboard (since key 12 is repetitive), was tested with the phrase "Now is the time for all good men to come to the aid of their country." It was found that only the word "aid" required any editing by the user since all the remaining terms were the only words for the typed code. Thus, the number of keys is significantly reduced from the standard 26 keys, to 14 keys, with the amount of editing being minimal.

Where there are four or fewer keys, the user may always keep four fingers positioned over the respective keys, such as for FIG. 12. Or, as with FIG. 11, the user may use two fingers, each finger assigned two keys. For five to nine keys, the user may choose to use 3 fingers of one hand by using two to three keys for each finger, such as for the configuration of FIG. 13. For twelve keys, such as with FIG. 13, the user may use four fingers of one hand. The keyboard is thus preferably configured to minimize fatigue on the user by reducing finger movement.

Figure 21:
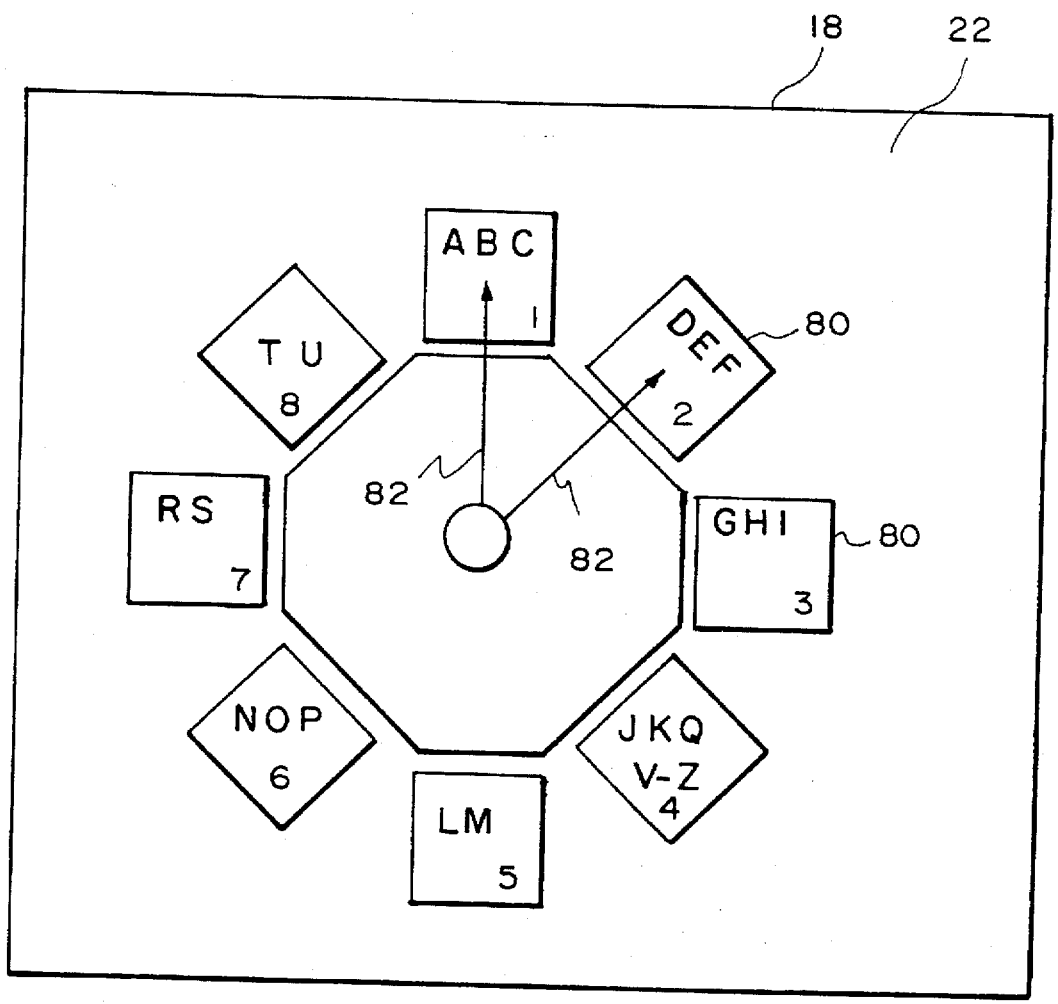
FIG. 21 shows an alternative keyboard configuration for use on the touch-screen monitor of FIG. 1.

FIG. 21 shows still yet another alternative embodiment of the invention, as implemented on a touch screen 22, such as found on a conventional computer monitor 18. Key representations 80 are displayed on the monitor 18 about a general hexagonal pattern. Letters and numerical codes are assigned to each key representation as with the manual keyboards, such as shown.

The user positions a pointer (not shown) in the center of the hexagon and slides the pointer outward along the screen 22 into one of the key representations 80. This movement is generally shown to correspond to arrows 82. As the pointer enters the key representation, the key is activated. The letters corresponding to the key are thereby selected and the user returns the pointer to the center position of the hexagon. This touch-screen system is particularly suited for persons with disabilities, and may also be configured to recognize input from suitable input devices, such as being responsive to light emitted from a pointer.

As an additional feature of the invention, when long words are being entered, the system would recognize before the typist has typed all the letters, that there is only one word that begins with the code that has thus far been entered. At this point, the word would be printed on screen 22 and a beep would sound. The user would then start typing the next word. The user would also be able to modify the word in the manners described above.

For instance, referring to Table 2, suppose the user enters the code 1-3-2. At that point, there are several possible words that the user may choose from, specifically "aid", "age", and "bid". More importantly, however, the user may continue typing to further limit the word to numerous words that cannot be determined yet, such as "aged", "ages", "ageless", "bids", "bidding", and so forth. However, if the user then strikes letter key 4, the only option left available is the word ageless. At that point, the word "ageless" may be displayed on screen 22. Accordingly, the user will not have to go to the trouble of having to entirely type the more lengthy words, such as "ageless".

TABLE 2

| Code | Words |
| --- | --- |
| ... | |
| 1 | a |
| 1-3-2 | age |
| | aid |
| | bid |
| 1-3-2-2 | chef |
| | aged |
| | bide |
| 1-3-2-4-2-7-7 | ageless |
| ... | |

As shown in Table 2, to determine whether there are any other words beginning with the code 1-3-2, the computer 10 will have to search through codes having at least that numerical order. However, as shown in Table 3, each memory location of memory 12 may be configured so that all available options are stored at the base code, 1-3-2. Thus, once the user types 1-3-2, the limited number of options may all be displayed at that time. That is, the words "age", "aid", "bid", "chef", "aged", "bide", "ageless", and other variations such as "bidding", "chefs" and so forth, are displayed on screen 22. This embodiment is quicker and reduces memory space requirements, but is only practical where there are a limited number of subsequent variations to the input code.

TABLE 3

| Code | Words |
| --- | --- |
| ... | |
| 1 | a |
| 1-3-2 | age |
| | aid |
| | bid |
| | chef |
| | aged |
| | bide |
| | ageless |
| 1-3-2-2 | chef |
| | aged |
| | bide |
| 1-3-2-4-2-7-7 | ageless |
| ... | |

As yet another feature of the invention, the user may at any time return to a word, such as by placing the cursor at any position within the word. When the user returns to the word, the numerical code associated with that word will be recalled. The user may then elect to display the preferred words, or all the words associated with that code. The user may also change the code to enter a new word.

Another feature of the invention, as mentioned above, is that the user may be provided with the option to switch between the different keyboard configurations, including the QWERTY format. Though not indicated in the flow chart, the user may select to change keyboard configuration at any point during operation of the system. Essentially, the user may select any suited number of keyboard configurations, such as a 4-key, 6-key, or 8-key configuration.

The memory 12 stores individual tables for each of the selectable keyboard configurations. One manner in which the proper memory location is accessed is by automatically and internally including a keyboard code as the first digit to the numerical code. For example, in order to identify the code as coming from the 6-keyboard configuration, the code "6" is automatically appended to the beginning of each word as each new word is begun, as shown in Table 4. The system would then be able to switch between keyboard configurations in the middle of a document, while still recognizing the input code as matching the particular keyboard configuration. Accordingly, the next time the system is operated, the system will default to the last-saved configuration when formatting, step 102.

TABLE 4

| Code | Words |
| --- | --- |
| ... | |
| 6-1 | a |
| 6-1-3-2 | age |
| | aid |
| | bid |
| 6-1-3-2-2 | chef |
| | aged |
| | bide |
| 6-1-3-2-4-2-7-7 | ageless |
| ... | |

In addition, the user may also choose to define his/her own keyboard arrangement of keys in addition to the standard arrangements that have been predefined. As described above, each numeral key is used as an input numerical code that is associated with the corresponding letters. The user selects the numerical code that is to be assigned to particular letters and keys. This information is then stored in memory, and the memory is further updated to reflect the new codes to be associated with the words in memory. The computer then sorts and stores all the words associated with the same numerical code in a single memory location associated with that particular numerical code.

However, the memory 12 shown by Table 4 would result in each word being stored several times, once for each keyboard configuration. In an alternative embodiment, the numerical code for each keyboard configuration is stored for each word, as shown in Table 5. The computer 10 would then search for the numerical code in accordance with the specified keyboard configuration.

TABLE 5

| Code | | Words |
| --- | --- | --- |
| 6-Keys | 8-Keys | |
| 2-5-5-5 | 2-5-5-6 | door |
| 2-5-5-5 | 2-6-5-6 | drop |

As an additional feature of the invention, the user may at any time elect to display words in memory. At that time, the user may add, delete, or otherwise modify the words stored in memory or verify the correct spelling of a word. The user may also list all words in the database or memory that start with the first letters of a typed word. In other words, a typist could type the first 4, 5 or 6 letters of a word and then select for the system to generate a list of all of the words that start with those letters. The typist can select this option while typing or editing the word. In this manner, the system may be used to determine the correct spelling of a word.

Accordingly, the user need not finish typing long words, which may be displayed automatically after the user enters, for instance, the first 4, 5, or 6 letters of a word. The user then selects the desired word by highlighting the word and hitting ENTER. The word is then moved into the text of the document. As a further option, the system may be configured only to display the words corresponding to the number of letters the user depressed. That is, if the user pressed 7 letters, only 7 letter words having the first 4 keys will be displayed.

The speed typing method of the present invention is compatible with conventional word processing programs, such as "WORD PERFECT" and "WORD", and can be used for either DOS, WINDOWS or Macintosh environments. Furthermore, the database of words and numerical codes may be searched in any suited manner.

By providing multiple characters on a single key, the present invention simplifies learning how to type. Furthermore, less motion is required to type, thereby reducing wear on the user while increasing speed. In addition, the keyboard is not congested, making it easier to use for persons that have not learned to type. Also, there is more room on the keyboard so that the size of the keys may be made larger, thereby assisting persons with arthritis or other physical disabilities.

Since the keyboard 50 is significantly reduced in size, yet retains the full spectrum of characters, the invention has particular utility with lap-top computers and hand-held electronic devices such as electronic diaries. Since there are fewer keys, the location of each key is easier to remember and all of the keys can be reached more easily and quickly and with greater certainty of accuracy.

Likewise, since the present invention reduces the number of keys required for typing, the conventional chord systems become more practical. Accordingly, the system may be configured so that the user depresses more than one key simultaneously or sequentially to select a particular key containing a code.

The foregoing descriptions and drawings should be considered as illustrative only of the principles of the invention. The invention may be configured in a variety of shapes and sizes and is not limited by the dimensions of the preferred embodiment. For example, the terms "key" and "keyboard" as used herein need not be limited to a group of mechanical components that are physically depressed by the operator. The input code may be optically-read handwritten symbols, each symbol representing a key-stroke. The input code could be voice-initiated whereby a voice identifying system may translate a verbal "keystroke" into the coded input. Thus, the operator may verbally state "5","5","8",which symbols are detected converted into the 5-5-8 code and displayed as "now" or "mow" as discussed above. Numerous applications of the present invention will readily occur to those skilled in the art. For example, the dictionary may be limited to a particular theme. By limiting the database of words, typing is further speeded. In addition, the memory tables of the invention may be integrated with dictionary information and other editing techniques currently existing in a word processing system. The dictionary need only be updated with the proper numerical codes. Therefore, it is not desired to limit the invention to the specific examples disclosed or the exact construction and operation shown and described. Rather, all suitable modifications and equivalents may be resorted to, falling within the scope of the invention.

I claim:

1. A method for enabling text formed from letters of an alphabet to be created on a display device using a word processing system including a computer having a memory storage, a display device and an input device including a plurality of operator-selectable input elements, said method comprising:

defining a set of plural input elements numbering less than the total number of letters of an alphabet;

assigning a plurality of letters of the alphabet to the input elements of said set such that each input element has one or more letters and at least one of the input elements has a plurality of letters;

assigning at least one input element code to each input element of said set such that not more than one input element code is assigned to at least one of said input elements having a plurality of letters;

storing in the memory storage a list of words formed from letters of the alphabet and word codes, each of the word codes formed from a series of one or more input element codes, each of said word codes associated with one or more or said words and at least one of said word codes associated with more than one word;

detecting a word by reading a series of input elements selected by the operator and retaining the series of input element codes associated with each selected input element;

creating a word code formed from the series of input element codes associated with each selected input element;

searching the memory storage and locating at least one word associated with each created word code; and displaying at least one of said words located in the memory storage on the display device.

2. The method of claim 1, wherein the step of assigning a plurality of letters comprises assigning a single letter to at least one of said input elements of said set.

3. The method of claim 1 including locating from the memory storage all words associated with said created word code and displaying all of said words, and wherein the method further comprises enabling the operator to select at least one of the displayed words and removing the unselected words from the display.

4. The method of claim 3, wherein the step of enabling the operator to select at least one of the displayed words comprises the steps of displaying a numerical identifier adjacent each displayed word and enabling the user to select a displayed word by selecting the corresponding numerical identifier.

5. The method of claim 3, wherein the step of enabling the operator to select at least one of the displayed words comprises the step of enabling the user to highlight one of the displayed words.

6. The method of claim 1, further comprising the step of enabling the operator to select which of the words responsive to a created word code is to be displayed.

7. The method of claim 1 further comprising defining an alternate set of plural input elements less than the total number of letters in an alphabet and enabling an operator to select an input element from one of said set and said alternate set of plural input elements.

8. The method of claim 1, wherein the steps of searching and locating comprise the steps of searching and locating less than all words associated with said created word code.

9. The method of claim 1, wherein the step of creating a word code further comprises the step of determining the completion of a word.

10. The method of claim 9, wherein said step of determining the completion of a word comprises detecting operator selection of input elements associated with a space, punctuation mark, or an Enter key.

11. The method of claim 1 including locating from the memory storage all words associated with said created word code and displaying a plurality of said words less than the total number of all words associated with said created word code, and wherein the method further comprises enabling the operator to select at least one of the displayed words and removing the unselected words from the display.

12. The method of claim 11, wherein the steps of enabling the operator to select a displayed word and removing the unselected words occurs after words have been displayed for a plurality of created word codes.

13. The method of claim 11, further comprising the steps of enabling the user to edit the at least one selected word by selecting an input element to form an edited word, creating an edit word code formed from the series of input element codes associated with the edited word, and setting the edit word code as the created word code.

14. The method of claim 1, wherein the step of assigning a plurality of letters of the alphabet to the input elements comprises assigning each letter of the alphabet to the input elements of said set.

15. The method of claim 1, wherein each of the input element codes are associated with a number and wherein the word codes stored in memory storage are a series of numbers stored in numerical order.

16. The method of claim 1, further comprising the step of displaying the input element code associated with a selected input element.

17. The method of claim 1, wherein the list of words corresponds to a group of words having a common subject.

18. The method of claim 1, wherein the step of defining a set of plural input elements further comprises the step of selecting different keyboard configurations.

19. The method of claim 1, wherein the step of assigning a plurality of letters of the alphabet to the input elements comprises assigning at least one vowel and at least one consonant to at least one input element.

20. The method of claim 1, wherein the step of assigning a plurality of letters of the alphabet to the input elements comprises assigning no more than one vowel to at least one input element.

21. The method of claim 1, wherein the step of assigning a plurality of letters of the alphabet to the input elements comprises assigning seldom-used letters to the same input element.

22. The method of claim 1, wherein the step of assigning a plurality of letters of the alphabet to the input elements comprises assigning letters to the input elements to minimize the number of words associated with the same word code.

23. The method of claim 1, wherein the input element code comprises a numerical value.

24. The method of claim 1, wherein the input element code is a unique numerical code.

25. The method of claim 1, further comprising the step of enabling the user to select preferred words for each word code stored in the memory storage.

26. The method of claim 25, wherein the step of enabling the user to select preferred words further comprises enabling the user to select a prioritized order of preferred words.

27. The method of claim 1, further comprising the step of selecting preferred words for each word code stored in the memory storage based upon usage of words.

28. The method of claim 1, further comprising the step of enabling the user to add at least one new word to the list of words.

29. The method of claim 1, wherein the step of displaying comprises displaying letters associated with each input element selected by the operator.

30. The method of claim 29, further comprising the steps of enabling the user to select at least one of the displayed letters to create a new word, displaying the new word and storing the new word in memory storage associated with a word code representing the series of input elements selected by the operator.

31. The method of claim 1, further comprising the step of providing an overlay to indicate letters associated with each input element.

32. The method of claim 1, further comprising the step of enabling the user to select preferred words for each word code stored in memory storage to designate a word as a preferred word.

33. The method of claim 1, wherein the step of displaying comprises displaying at least one of said words located in the memory storage in scrollable windows on the display device.

34. The method of claim 1, wherein the step of displaying comprises displaying each word in a stacked horizontal arrangement.

35. The method of claim 34, wherein the step of displaying further comprises displaying letters associated with each selected input element vertically above the horizontal arrangement.

36. The method of claim 35, further comprising the step of locating a word code in memory closest to the created word code if the created word code is not found in memory.

37. The method of claim 34, wherein the step of displaying further comprises displaying words having greater preference above words having lower preference.

38. The method of claim 1, further comprising the step of determining that a selected word code is not in memory.

39. The method of claim 1, wherein the series of selected input elements corresponds to less than an entire word.

40. The method of claim 39, further comprising the step of providing an audible alert after the step of displaying at least one of said words located in the memory storage.

41. The method of claim 1, wherein the step of assigning a plurality of letters of the alphabet to the input elements comprises assigning each letter of the alphabet to the input elements in an alphabetical order.

42. The method of claim 1, wherein not more than one input element code is assigned to each of the input elements.

43. The method of claim 1, wherein each word is associated with one word code.

44. The method of claim 1, wherein at least a plurality of said word codes are associated with more than one word.

45. The method of claim 1, further comprising the step of assigning an input element code to a sequential or simultaneous actuation of the input elements.

46. An apparatus for enabling text to be created on a display, the apparatus comprising:

an input device including a plurality of keys, at least one of the keys associated with a plurality of letters;

means for detecting selection of a sequence of one or more keystrokes of the keys;

a memory for storing a plurality of words each of which are associated with a word code representing a sequence of one or more keystrokes, each word code associated with one or more of said words and at least a plurality of said word codes associated with more than one word;

search means for comparing the detected sequence of keystrokes with the word codes in memory and for selecting the word code associated with the detected sequence of keystrokes;

means for displaying at least one of the words associated with the selected word code; and, means for selecting one of said displayed words and removing all unselected words from the display.

47. The apparatus of claim 46, further comprising means for selecting preferred words for each word code stored in memory.

48. The apparatus of claim 47, wherein the means for selecting preferred words further comprises selecting a prioritized order of preferred words.

49. The apparatus of claim 47, wherein the means for selecting preferred words further comprises means for selecting a priority of preferred words for at least one word code stored in memory based upon usage of words.

50. The apparatus of claim 47, wherein the means for displaying words further comprises displaying preferred words in priority to non-preferred words.

51. The apparatus of claim 46, wherein the at least one key is associated with a single letter.

52. The apparatus of claim 46, further comprising an overlay for indicating the letters associated with each key.

53. The apparatus of claim 46, wherein the means for displaying comprises scrollable windows.

54. The apparatus of claim 46, wherein the sequence of keystrokes corresponds to less than an entire word.

55. The apparatus of claim 46, wherein the means for displaying comprises means for displaying preferred words in priority to non-preferred words.

56. The apparatus of claim 46, further comprising means for indicating that a detected sequence of keystrokes is not in said memory.

57. The apparatus of claim 56, further comprising means for determining a word code closest to a detected sequence of keystrokes when said search means indicates that the detected sequence of keystrokes is not in said memory and for setting the closest word code as a selected word code.

58. The apparatus of claim 46, further comprising means for displaying the letters associated with each key of the sequence of keystrokes.

59. The apparatus of claim 58, wherein the means for displaying further comprises displaying each selected word in a stacked horizontal arrangement and displaying the letters associated with each key of the sequence of keystrokes vertically above the horizontal arrangement.

60. The apparatus of claim 59, wherein words having greater preference are displayed above words having lower preference.

61. The apparatus of claim 59, wherein the means for selecting comprises means for highlighting one of said letters or words.

62. The apparatus of claim 58, further comprising means for selecting at least one of said displayed letters to create a new word, displaying the new word and storing the new word in memory associated with a code representing the sequence of keystrokes.

63. The apparatus of claim 46, further comprising means for assigning a plurality of letters in an alphabet to the keys such that at least one key has one or more letters and at least one of the keys has a plurality of letters.

64. The apparatus of claim 63, further comprising means for assigning a key code to each of the plurality of keys such that not more than one key code is assigned to each of the at least one of the keys having a plurality of letters, each word code representing a sequence of key codes.

65. The apparatus of claim 46, further comprising means for assigning at least one key code to each of the plurality of keys, each word code representing a sequence of key codes.

66. The apparatus of claim 65, wherein no more than one key code is assigned to at least one of the at least one key associated with a plurality of letters.

67. The apparatus of claim 65, wherein not more than one key code is assigned to each of the plurality of keys.

68. The apparatus of claim 65, wherein the means for assigning a key code further comprises means for assigning a key code to a sequential or simultaneous actuation of the keys.

69. The apparatus of claim 65, wherein said search means compares a sequence of key codes associated with the detected sequence of keystrokes with the word codes in memory and selects the word code associated with the detected sequence of keystrokes.

70. The apparatus of claim 65, wherein the means for displaying further comprises means for displaying the key code associated with a selected key.

71. The apparatus of claim 65, wherein the key code comprises a numerical value.

72. The apparatus of claim 65, wherein the key code comprises a unique numerical value.

73. The apparatus of claim 46, further comprising means for determining the completion of a word.

74. The apparatus of claim 73, wherein the means for determining the completion of a word comprises detecting an operator selection of a key associated with a space, punctuation mark, or an Enter key.

75. The apparatus of claim 46, wherein said display means displays less than all words associated with the selected word code.

76. The apparatus of claim 46, wherein the means for displaying further comprises means for enabling the operator to select which of the words associated with the selected word code is to be displayed.

77. The apparatus of claim 46, the input device further comprising a plurality of alternate keys, at least one of the alternate keys associated with a plurality of letters.

78. The apparatus of claim 46, wherein the means for displaying further comprises means for displaying a numerical identifier adjacent each displayed word, and the means for selecting further comprises means for selecting one of the displayed words by selecting the corresponding numerical identifier.

79. The apparatus of claim 46, wherein the means for selecting comprise means for enabling the user to highlight one of the displayed words.

80. The apparatus of claim 46, wherein the word codes are numbers stored in numerical order.

81. The apparatus of claim 46, wherein the plurality of words stored in memory correspond to a group of words having a common subject.

82. The apparatus of claim 46, further comprising means for enabling the user to select different configurations of said input device, each configuration having a different arrangement of letters on the keys of said input device.

83. The apparatus of claim 46, wherein at least one of the keys is associated with at least one vowel and at least one consonant.

84. The apparatus of claim 46, wherein no more than one vowel is associated with each key.

85. The apparatus of claim 46, wherein at least one key is associated with seldom-used letters.

86. The apparatus of claim 46, further comprising means for enabling the user to add at least one new word to said memory.

87. The apparatus of claim 46, wherein the word codes comprise numbers and the memory further stores the word codes in numerical order.

88. The apparatus of claim 46, further comprising means for enabling the user to edit the selected word to form a detected sequence of edit keystrokes, and means for setting the detected sequence of edit keystrokes as the detected sequence of keystrokes.

89. The apparatus of claim 46, the plurality of keys each associated with a plurality of letters.

90. The apparatus of claim 46, wherein each word is associated with one word code.

91. The apparatus of claim 46, further comprising means for assigning letters to the keys to minimize the number of words associated with the same word code.

92. The apparatus of claim 46, wherein the means for selecting further comprises means for providing an audible alert.

93. The apparatus of claim 46, wherein each letter of an alphabet is associated with a key.

94. The apparatus of claim 46, further comprising means for assigning letters to the keys to in an alphabetical order.

* * * * *